United States Patent [19]

Parks

[11] 4,137,640

[45] Feb. 6, 1979

[54] GAUGE FOR LENS LAPPING TOOLS OR THE LIKE

[76] Inventor: Stanley M. Parks, c/o OPT-TECH, Osborn Building, 1020 Huron Rd., Cleveland, Ohio 44115

[21] Appl. No.: 862,113

[22] Filed: Dec. 19, 1977

[51] Int. Cl.² ........................... G01B 5/20; G01B 3/22
[52] U.S. Cl. ............................... 33/174 A; 33/172 R
[58] Field of Search ............. 33/169 B, 172 R, 172 D, 33/174 R, 174 A, 178 R, 178 D

[56] References Cited

U.S. PATENT DOCUMENTS

| | | | |
|---|---|---|---|
| 965,211 | 7/1910 | Moe | 33/174 A |
| 1,521,117 | 12/1924 | Miller | 33/174 A |
| 1,582,133 | 4/1926 | Demers | 33/172 R |
| 3,461,566 | 8/1969 | Gerstner | 33/174 R |
| 4,077,722 | 3/1978 | Bicskei | 33/174 A |

FOREIGN PATENT DOCUMENTS

| | | | |
|---|---|---|---|
| 972791 | 9/1959 | Fed. Rep. of Germany | 33/172 R |
| 20889 | 9/1969 | Japan | 33/174 A |

*Primary Examiner*—Richard R. Stearns

[57] ABSTRACT

A gauge for measuring curvatures from tools such as lens lapping tools is disclosed. Such gauge includes a base providing a tool support and a gauge head movable relative to the base tool. The gauge head provides a pair of fixed posts having hemispherical ends and a movable post provided by a dial indicator located midway between the fixed posts. The posts are arranged so that they are movable into engagement with the curved surface of the tool when the measuring head is lowered. These three posts are located in a measuring plane and operate to determine the relative position of three points along the curved surface of the tool at the intersection of the tool surface and the measuring plane. The tool support is rotatable through 90 degrees to position the tool with the main curvature and cross curvature selectively positioned parallel to the measuring plane. The tool support also permits movement of a tool in a direction perpendicular to the measuring plane in each position so that the measuring plane intersects the tool surface along an equator in each position of the tool to ensure accurate measurement of the curvature along two equators perpendicular to each other.

14 Claims, 5 Drawing Figures

GAUGE FOR LENS LAPPING TOOLS OR THE LIKE

BACKGROUND OF THE INVENTION

This invention relates generally to the measurement of curves, and more particularly to a guage suited for measuring the curvature of lapping tools used in the manufacture of lenses for glasses or the like.

In the manufacture of lenses for eyeglasses or the like, it is customary to produce the final curvature of the lens with a lapping tool provided with the necessary curvature to produce the shape required by the prescription for the lens. The accuracy of the lens is ultimately determined by the accuracy of the curvature provided on the lapping tool. It is therefore necessary to provide means for accurately determining such tool curvature. Further, such lapping tools are often provided with two curvatures with one uniform curvature or base curvature extending in a first direction and a second uniform but different curvature or cross curvature extending in a second direction perpendicular to the first direction. In the past, the curvature has been measured by accurately formed metal gauge templates, which are formed with an edge having a known curvature. Such templates are held against the lapping tool, with the template having the first desired curvature held against the tool in alignment with the first direction to determine the first curvature and a second template having the second desired curvature held against the tool in alignment with the second direction to measure the second curvature.

The measurement with such templates leads to errors, since the fit of the template against the surface of the tool must be visually determined. Further, any misalignment between the plane of the template and the first and second directions introduces erroneous measurements.

More recently, gauges have been employed wherein an accurate dial indicator is mounted on a base, with its movable dial indicator post located midway between and in a plane containing a pair of fixed posts. In such gauges, means are provided to support the lapping tool on the gauge and to move the three posts into engagement with the surface of the tool. The curvature is determined with such a gauge by determining the relative positions of three points along the curve which are a known distance apart. With the information concerning such three points along the curve provided by the gauge, the radius of curvature is mathematically determined.

Such support for the tool is usually arranged to accept the tool in two positions. In the first position, the tool is supposed to be positioned with the first direction or axis aligned with the plane of the posts and in the other position, the second direction or axis is supposed to be aligned with the plane of the posts. Such gauges, if accurately manufactured and calibrated, provided, in theory, accurate measurement of the two curvatures. However, in practice erroneous readings occur because the axes of the curves on the tool are not necessarily positioned in the plane of the three posts and the gauge does not consistently measure the curvature at an equator but, in practice, often measures the curvature along a plane spaced from the equator.

SUMMARY OF THE INVENTION

A gauge in accordance with the present invention provides a simple device for accurately measuring the curvature of items such as lapping tools and the like used in the manufacture of lenses. Such gauge includes indicator means providing a movable post and two fixed posts, all of which are contained in a plane. With the gauge, it is determined when the plane of measurement intersects an equator of the curve so that erroneous measurements are not made. A tool support is provided for positioning one direction of the curvature parallel to the plane of measurement and the gauge permits the moving of the tool and the plane relative to each other, while maintaining such parallel relationship until the plane of measurement intersects the tool surface along an equator.

In the illustrated embodiment, an accurate dial indicator is used to display the measurement and the same dial indicator is used to determine when the plane of measurement is positioned along an equator of the curvature. Further, the fixed posts are provided with spherical ends to minimize the likelihood of errors produced by any slight irregularity in the tool surface.

DETAILED DESCRIPTION OF THE DRAWINGS

Figure 1:
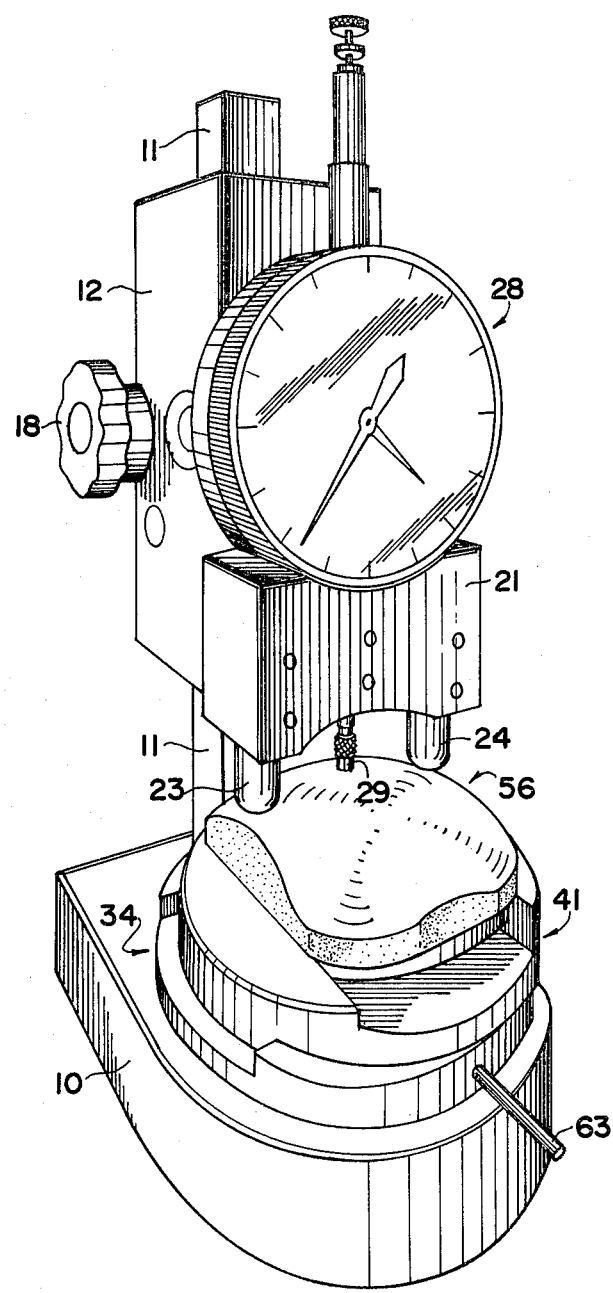
FIG. 1 is a perspective view of one preferred embodiment of this invention, illustrating the gauge in use for the measurement of the curvature of a lapping tool used in the manufacture of prescription lenses for glasses.

In the manufacture of lenses for eyeglasses or the like, it is customary to rough grind or otherwise form the lens to the approximate curvature required. Then the lens is finished with an accurately formed lapping tool to the final required curvature.

Since lenses of such type are manufactured to particular prescriptions, and because such lenses very often have one predetermined curvature along one direction or axis and another predetermined curvature along another perpendicular direction or axis, it is conventional practice in the manufacture of lenses to manufacture a particular lapping tool having the curvatures required for the particular lens being produced. Such lapping tools are usually produced by special machines designed for that purpose.

In order to determine if the lapping tool is provided with the correct curvature, it is necessary to provide some gauge or measuring means to accurately measure the curvature of the lapping tool. A gauge in accordance with the present invention is especially suited for such purpose and provides a device for quickly, easily, and accurately measuring the curvature of such a lapping tool. It should be understood that although the gauge illustrated is particularly suited for such purpose, gauges incorporating this invention in its broader aspects could be used to measure the curvature of other devices and that, except insofar as is specifically specified in the claims, the present invention is not limited to the measurement of lapping tools for lens manufacture.

Referring to the drawings, the gauge in accordance with the preferred embodiment of this invention consists of a base 10 having a square cross section rigid gauge head support 11 extending upwardly therefrom. Mounted on the head support 11 for longitudinal movement relative thereto is a head slide 12. The slide is provided with accurately formed bearings (not illustrated) which closely fit the surface of the support 11 and guide the slide for movement along the length of the support 11.

Figure 3:
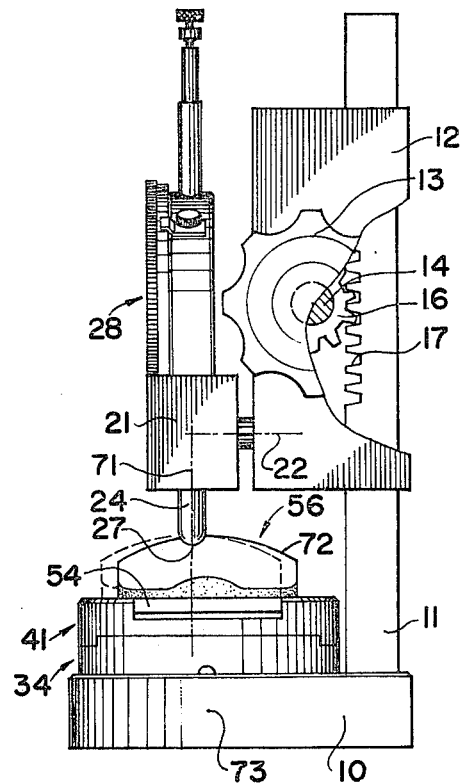
FIG. 3 is a side elevation illustrating the manner in which the lapping tool can be moved until its equator is intersected by the plane of measurement of the gauge and also illustrating the mechanism for raising and lowering the gauge slide.

As best illustrated in FIG. 3, an adjusting knob 13 is mounted on a cross shaft 14 which is journaled on the slide 12 and is provided with a gear 16 which meshes with teeth 17 on the support so that the vertical position of the slide 12 along the support 11 is controlled by rotation of the knob 13.

A lockscrew having a knob 18 at its outer end is threaded into the slide and bears against the support 11 at its inner end to allow the slide to be locked in any given adjusted position or to permit the adjustment of the friction resisting movement of the slide 12.

Pivotally supported on the slide 12 is an indicator support 21 mounted for limited oscillating movement about a pivot axis 22. Depending from the indicator support 21 are a pair of laterally spaced, fixed posts 23 and 24, each of which is formed with a hemispherical end at 26 and 27, respectively.

Figure 4:
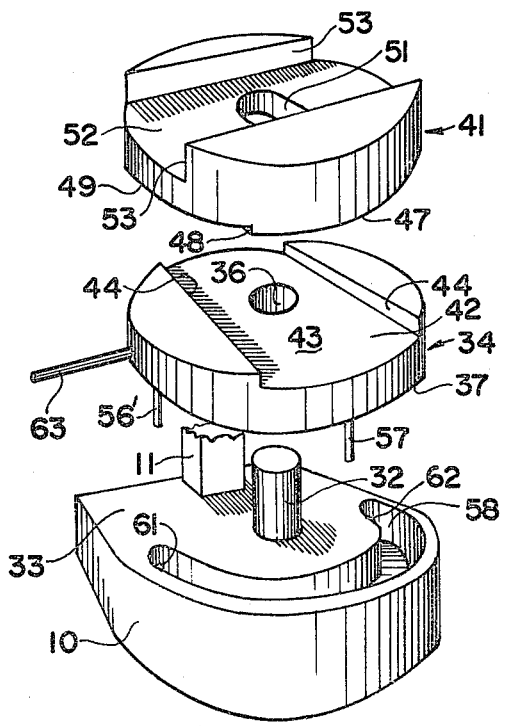
FIG. 4 is an exploded, perspective view of the elements of the lapping tool support.

Also mounted on the indicator support 21 is an accurate dial indicator 28 providing a movable post 29 located midway between the two fixed posts 23 and 24. Such dial indicator provides hands 31 which indicate the position of the movable post 29 with respect to the two fixed posts 23 and 24. Such indicator is preferably capable of measurement in the order of Mounted on the base 10 is a tool support assembly, the structure of which is best illustrated in FIG. 4. Such assembly includes a fixed, cylindrical pivot pin 32 extending up from the upper face 33 of the base 10 and a first support member 34 having a central bore proportioned to closely fit the pin 32 when assembled so that the first support member 34 is laterally positioned with respect to the base but is journaled for rotation about the axis of the pin. The lower surface 37 of the first member 34 engages the upper surface 33 to vertically locate the member 34.

A second support member 41 is supported on the first support member 34 in a manner which allows relative movement therebetween in only one direction. The structure for accomplishing this includes a lateral recess 42 providing a bottom wall 43 and opposed, parallel sidewalls 44. The second support member 41 is provided with a depending projection 47 having a width arranged so that its opposed and parallel sidewalls 48 closely fit the adjacent and mating sidewalls 44 so that the second supporting member 41 is restrained from all lateral movement except movement in the direction of the projection 47 and groove 43. The vertical position of the second support member 41 is provided by the engagement of the lower surface 49 of the second support member on opposite sides of the projection 47.

An elongated central opening 51 in the second support member receives the upper end of the pin 32. Such opening 51 is elongated in the direction of the projection 47 so that the upper support member 41 can move back and forth in the direction of the opening 51 and the projection 47, but the amount of such movement is limited in each direction by engagement of the upper end of the pin 32 with the ends of the opening 51.

The upper surface of the second support member 41 is formed with a lateral groove 52 providing opposed, parallel sidewalls 53 proportioned to receive, with a relatively close fit, a depending projection 54 on a lapping tool 56, as best illustrated in FIG. 3. The groove 52 extends perpendicular to the direction of the groove 43 and projection 47 and allows movement of the lapping tool 56 relative to the second support member 41 in a direction perpendicular to the direction of movement which can occur between the two support member 34 and 41.

The support assembly, consisting of the two support members 34 and 41, is rotatable through 90 degrees with respect to the base 10. A pair of depending pins 56' and 57 extend downwardly from the lower surface of the first support member 34 into a recess 58 with clearance. The two pins 56' and 57 are substantially 90 degrees apart. When the support assembly is rotated to the position indicated generally in FIGS. 2 and 4, one of the pins 56' engages a first adjusting screw 61 threaded into the base 10, and when the support assembly is rotated 90 degrees from such position to its other extreme of movement, the pin 57 engages a second adjusting screw 62 to limit rotation of the support assembly in such direction. The two adjusting screws 61 and 62 are adjusted in the manner described below to ensure that the two axes of the tool 56 are properly aligned at each extreme position of travel of the support assembly. A lateral pin 63 projecting from the first support member 34 provides a convenient means for rotating the support assembly between its two positions.

The gauge in accordance with the illustrated embodiment of this invention is used in the following manner for measuring the curvature of a lens lapping tool having two different curvatures extending along perpendicular axes. The use of the gauge presupposes that the gauge has been previously calibrated, as discussed later.

Figure 2:
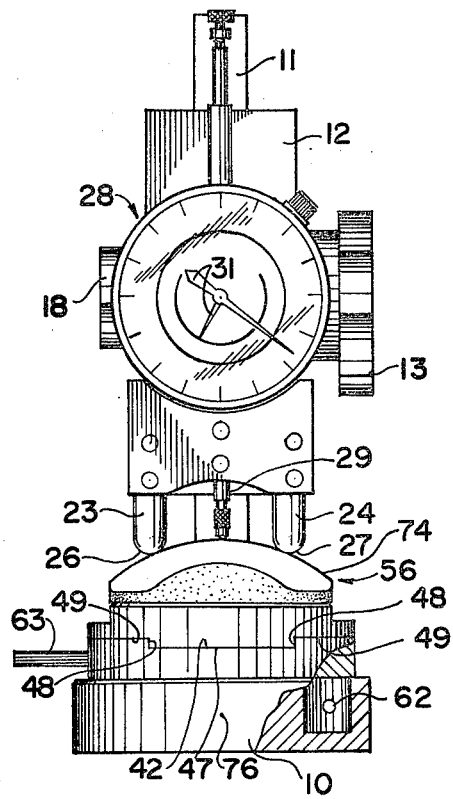
FIG. 2 is a front elevation, partially in section.

First the lapping tool 56 is positioned in the groove 52 on the support assembly, and the support assembly is rotated to one of its positions, for example, the position illustrated in FIGS. 2 and 3. In such position, the base curvature or curvature in alignment with the major dimension of the tool is maintained parallel with the plane containing the three posts of the gauge, namely, the two fixed posts 23 and 24 and the movable post 29. Such plane is indicated by the line 71 in FIG. 3, and in the full line position in such figure, the long axis of the tool 72 is along a line represented by the point 73 in FIG. 3. In such instance, the short or cross axis 74 of the tool lies along a line represented by the point 76 in FIG. 2, and such axis 76 is perpendicular to the plane 71. When the elements are in the position of FIG. 3 illustrated in full line, the plane of measurement 71 containing the three posts is laterally spaced from the axis 73 and the equator of the main curvature so the gauge will not provide an accurate measurement of the main curvature 74. Instead, it will provide a measurement of a curvature spaced from the equator.

In the use of the gauge, the adjustment knob 13 is operated to bring the three posts down into engagement with the surface of the tool and the reading of the hands 31 is noted. Since the position of the tool is improper when the tool is in the full line position of FIG. 3, a reading taken in such position would be in error. In use, the knob 13 is manipulated to raise and lower the gauge while the tool is moved forward and back, causing the upper support member 41 to be moved forward and back with respect to the lower support member 34. As repeated measurements are made, it is noted when a reading is obtained with the lowest curvature indication, such measurement or reading is obtained when the tool 56 has been moved to the phantom line position of FIG. 3. In such position, the gauge measures the curvature along the equator of the main curvature 74 and provides the accurate measurement of such curvature. The reading in such condition is noted. Then, by use of the projecting pin 63, the support assembly is rotated through 90 degrees to bring the axis 76 into a position in which it is parallel to the plane 71 so that the cross curvature 72 can be measured. Here again, it is necessary to measure the cross curvature 72 along its equator and such measurement can only be obtained when the plane 71 intersects the tool surface along an equator. In this instance, the tool 56 is moved along the groove 52, while repeated measurements are made until the lowest curvature reading is obtained. This indicates that the measurement is along the equator and the measurement obtained at that point is noted.

It should be recognized by those skilled in the art that the distance of the end of the movable post with respect to the ends of the fixed post, which is determined by the gauge, provides the necessary information for calculating the exact curvature by the use of mathematical formulas and such formulas are therefore not set forth herein in order to simplify the presentation and understanding of the invention. It suffices to point out the distance between the points of engagement of the fixed posts on the surface of the lapping tool must also be known.

In accordance with the preferred embodiment of this invention, the fixed posts are formed with hemispherical ends so that erroneous readings will not be obtained because of slight irregularities caused, for example, by shallow grooves resulting from the milling operation used to form the curvature on the tool. However, it is recognized that when hemispheric ends are provided on the fixed posts the spacing between the zones of contact of the two fixed posts 23 and 24 and the surface of the tool varies with the amount of tool curvature and such variation is incorporated in the mathematical formulas used for determining the curvature from the measurements obtained. For convenience, it is the practice in many instances to utilize small computers which are programmed with the proper formulas for converting the measurement obtained by the gauge to curvatures.

It should be noted that it is not necessary to position the axis which extends perpendicular to the plane 71 in direct alignment with the movable post, since the indicator support block 21 is mounted for pivotal movement about the axis 22 to allow the indicator support block and the dial indicator to turn until both of the fixed posts 23 and 24 engage the surface of the tool.

Figure 5:
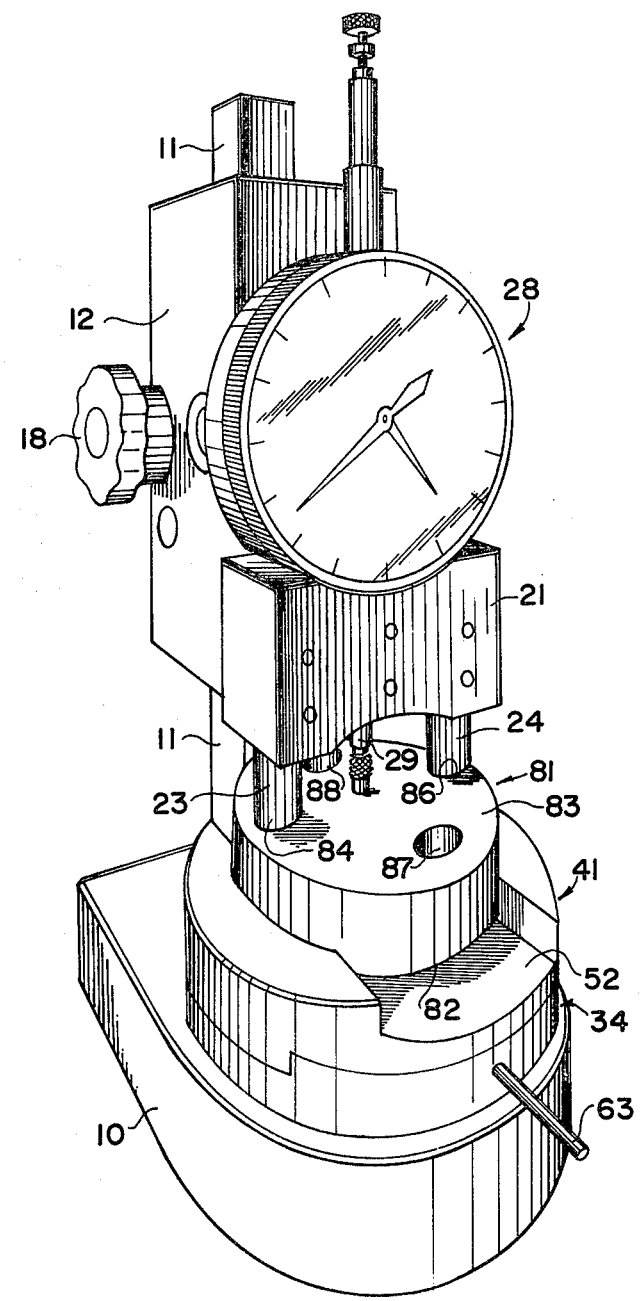
FIG. 5 is a perspective view similar to FIG. 1, but illustrating the gauge with a calibration block installed.

As mentioned previously, the gauge calibration should be checked from time to time, and this is easily accomplished by the use of a gauge block 81, illustrated in FIG. 5. Such gauge block is formed with a lower projection 82, which fits into the groove 52 of the upper or second support member 41 in the same manner as the tool 56. The upper surface 83 of the gauge block is accurately manufactured to be completely smooth and the gauge block is formed with two pairs of bores at 90-degree spacing. The first pair of bores consists of the bores 84 and 86, and the second pair of bores consists of the two bores 87 and 88.

The setting of the stop screw 62 is checked by rotating the support assembly to the position illustrated in FIG. 5 until the pin 57 engages the screw 62 and the head is lowered until the two fixed posts 23 and 24 project into the bores 84 and 86, respectively. If the fixed posts do not move smoothly and easily into the bores, it is an indication that the screw 62 is not properly adjusted, and appropriate adjustments are then made until such action can occur. The gauge head is then raised and the support assembly is turned through 90 degrees until the pin 56' engages the adjusting screw 61 and the fixed posts are again lowered until they extend into the bores 87 and 88, respectively. Here again, if the stop screw 61 is not properly adjusted, the fixed posts will not easily move into the bores and appropriate adjustment is made until such movement can occur. In this manner, the rotational movement of the tool support is adjusted to ensure that when a tool is being measured, one or the other of the axes 73 or 76 will be positioned to the plane 71. The support assembly is then rotated to position the gauge block 81 so that the ends of the two fixed posts can be lowered into engagement with the surface 83. The dial indicator is then adjusted until it indicates a zero reading, with the movable post 29 and the two fixed posts 23 and 24 engaging the flat surface 83.

With a gauge in accordance with the present invention, it is possible to accurately determine the curvature of the tool 56 because the gauge ensures that the curvature readings are taken along the equators of each of the curvatures involved. Further, the gauge is operable to accurately measure two different curvatures on a single tool. Still further, the calibration of the gauge is easily checked to ensure that the readings obtained are accurate.

Although a preferred embodiment of this invention is illustrated, it is to be understood that various modifications and rearrangements of parts may be resorted to without departing from the scope of the invention.

What is claimed is:

1. A gauge for measuring curvature of an item having a curved surface, comprising a base, measuring means mounted on said base, support means on said base for supporting said item for engagement of the curved surface thereof by said measuring means, said measuring means including a pair of fixed gauging surfaces engageable with said curved surface at first and second spaced points, and sensing means locating said curved surface at a third point spaced from said first and second points, all of said points being contained in a measuring plane, said sensing means being operable to determine the position of said third point with respect to said first and second points and thereby providing a determination of the curvature of said curved surface along the intersection thereof by said measuring plane, and guide means extending substantially perpendicular to said measuring plane for providing relative movement between said item and said measuring means in a direction substantially perpendicular to said measuring plane so that said plane intersects said surface along an equator of said curved surface.

2. A gauge as set forth in claim 1, wherein said support means is journaled on said base for rotation between first and second positions which are 90 degrees of rotation apart to permit measurement of said curved surface along two equators which are perpendicular to each other, and said guide means for providing relative movement between said item and said measuring means providing for relative movement between said item and said measuring means in a direction substantially perpendicular to said measuring plane when said support is in each of said first and second positions.

3. A gauge as set forth in claim 1, wherein said support means includes a first support member journaled on said base for rotation between first and second positions, and a second support member mounted on said first member for movement relative thereto in a first direction perpendicular to said measuring plane when said first support member is in said first position, said second support member being shaped to support said item for movement with respect thereto in a second direction perpendicular to said first direction with respect to said first support member and perpendicular to said measuring plane when said first support member is in said second position.

4. A gauge as set forth in claim 3, wherein said base is provided with a pivot pin on which said first support member is journaled, and said second support member is provided with an elongated opening receiving the end of said pivot pin, said pivot pin engaging the ends of said opening to limit the relative movement between said first and second support members.

5. A gauge as set forth in claim 4, wherein said fixed gauging surfaces are blunt and curved along said measuring plane to prevent erroneous measurements resulting from irregularities in said curved surface.

6. A gauge as set forth in claim 5, wherein said fixed gauging surfaces are hemispherical.

7. A gauge as set forth in claim 6, wherein said sensing means is a movable post located midway between said fixed gauging surfaces.

8. A gauge as set forth in claim 4, wherein a pair of adjustable stops are operatively connected between said first support and said base to locate said first and second positions, and a gauging block is provided for mounting on said second support member and determining the accuracy of adjustment of said first and second stops.

9. A gauge for lens lapping tools or the like having a compound curved surface having a first curvature and a second curvature normal to said first curvature, comprising a base, measuring means movable on said base in a first direction, support means on said base for supporting said tool with its curved surface substantially normal to said first direction, said measuring means including a pair of fixed gauging surfaces for engaging said curved surface at spaced points and a sensor for engaging said curved surface at an intermediate point between said spaced points with all said points contained in a measuring plane substantially parallel to said first direction, the location of said intermediate point with respect to said spaced points determining the curvature of said curved surface along the intersection thereof by said measuring plane, said support means providing for indexing said tool between first and second positions with one position aligning said measuring plane with said first curvature and the other position aligning said measuring plane with said second curvature, said support means providing first and second guide means respectively extending perpendicular to said measuring plane when said support means is in said first and second position, said guide means providing for movement of said tool in both of said index positions in a direction perpendicular to said measuring plane to position an equator of each curved surface in said measuring plane.

10. A gauge as set forth in claim 9, wherein said fixed gauging surfaces are provided by the ends of a pair of spaced, fixed posts, and said sensor is provided by the movable post of a dial indicator like measuring device.

11. A gauge as set forth in claim 9, wherein said measuring means is pivoted for movement relative to said base about a pivot axis perpendicular to said measuring plane.

12. A gauge as set forth in claim 9, wherein said support means includes a first support member journaled on said base for rotation between said first and second positions, a second support member mounted on said first support member for movement relative thereto in a second direction perpendicular to said measuring plane when said first support member is in said first position, said second support member being shaped to support said tool for movement with respect thereto in a third direction perpendicular to said second direction with respect to said first support member and perpendicular to said measuring plane when said first support member is in said second position.

13. A gauge as set forth in claim 12, wherein said fixed gauging surfaces are blunt and curved along said measuring plane to prevent erroneous measurements resulting from irregularities in said curved surface.

14. A gauge as set forth in claim 13, wherein said fixed gauging surfaces are hemispherical.

* * * * *